United States Patent [19]

Bush et al.

[11] 4,319,201
[45] Mar. 9, 1982

[54] SELF COMPRESSING SUPERSONIC FLOW DEVICE

[75] Inventors: John E. Bush, Ridgecrest, Calif.; David B. Fenneman, Fredricksburg, Va.; Ronald E. Smith, Ridgecrest, Calif.

[73] Assignee: The United States of America as represented by the Secretary of the Navy, Washington, D.C.

[21] Appl. No.: 90,834

[22] Filed: Nov. 1, 1979

[51] Int. Cl.$^3$ .................................... H01S 3/02
[52] U.S. Cl. .................................... 372/58; 239/553.5; 372/701
[58] Field of Search ............ 331/94.5 G, 94.5 C, 331/94.5 D, 94.5 P, 94.5 PE; 239/265.11

[56] References Cited

U.S. PATENT DOCUMENTS

| | | | |
|---|---|---|---|
| 3,224,193 | 12/1965 | Loprete et al. | 239/265.11 |
| 3,665,336 | 5/1972 | McLafferty | 331/94.5 D |
| 3,771,726 | 11/1973 | Mikeska | 239/265.11 |
| 3,886,477 | 5/1975 | Ruby et al. | 831/94.5 C |
| 4,200,819 | 4/1980 | Haslund | 331/94.5 PE |

OTHER PUBLICATIONS

"Gain of a Gasdynamic Laser Utilizing Products of Benzene Combustion" by Ktalkherman et al.; Sov. Jour. Quant. Elect., vol. 7, No. 1, (Jan. '77).

Primary Examiner—William L. Sikes
Assistant Examiner—Leon Scott, Jr.
Attorney, Agent, or Firm—Robert F. Beers; W. Thom Skeer; Kenneth G. Pritchard

[57] ABSTRACT

A method and apparatus for providing a self-compressing supersonic flow is provided by use of a contoured supersonic nozzle design. The shape of the supersonic nozzle array can be composed of curved blades which provide a focusing effect for a supersonic flow which will provide a gradient change in mach number along the supersonic flow path and efficient pressure recovery. Ideal design permits the self-compressing flow to have a secondary throat with down stream mach number of approximately one. As a result, a gas dynamic laser will have a well defined lasing region shortly after the increase in velocity of the working fluid to supersonic speeds. Controlled shaping of the supersonic flow is provided by means which will either use high speed jets or the Coanda effect. Further refining of the shape of the flow can permit the lasing region to take on the shape of a torus. This principle can be applied to devices other than gas lasers which require internal supersonic flow, such as wind tunnels, MHD machines, or certain propulsion devices.

21 Claims, 14 Drawing Figures

SELF COMPRESSING SUPERSONIC FLOW DEVICE

BACKGROUND OF THE INVENTION

1. Field of the Invention

This invention relates to directional control of fluids at supersonic speeds. Particularly, this invention relates to directional control of gases similar to those flowing within or discharged from a gas laser, wind tunnel, MHD machine, or propulsion device. In even greater particularity, the present invention relates to controlled gas patterns which exhibit well behaved properties due to the nature of the supersonic nozzle which creates the supersonic flow.

2. Description of the Prior Art

Conventional one dimensional supersonic flow devices are constructed to allow gas to flow from a high pressure chamber through a linear array of supersonic nozzles into a low static pressure cavity region with a flow which is essentially parallel at a near constant mach number. Partial pressure recovery of the gases is accomplished by passing the supersonic flow through a converging diverging diffuser or second throat.

While two dimensional cylindrical outwardly flowing supersonic flow devices have been mentioned in the art, no previous experiments on inwardly flowing gas lasers have been reported. All prior art two dimensional devices are outwardly expanding supersonic flow devices. Outward expansion in gas lasers suffers the disadvantage that, as the gas expands geometrically outward, the flow mach number increases over and above that needed for good laser operation, typically mach four or five, which worsens the problem of pressure recovery. The total pressure loss across a normal shock increases with increasing mach number. Thus, the pressure recovery of conventional material diffusers decreases with increasing mach number. An ideal diffuser will theoretically recover the total pressure of the higher mach flow as well as a lower mach flow assuming a normal shock just downstream of the diffuser throat. However, ideal diffusers are not realized in practice.

Outwardly expanding supersonic flow devices also suffer from design limitations due to the requirement that the inlet flow be unchoked. This requirement leads to a flow limitation through the device due to the constraint of subsonic flow on the upstream side of the throat. This requirement severely constrains the design of a practical device for many applications.

An inwardly flowing gas laser retains many of the packaging and weight reduction quantities provided in outwardly expanding flow designs. In addition it offers a great potential advantage in pressure recovery of the flow. The gas, after expanding to the required mach number in the nozzle region, becomes generally and gradually compressed through the geometrical contraction effect. If this contraction is continued, and followed by an expansion, the flow is made to pass from supersonic to subsonic, potentially allowing very efficient pressure recovery.

SUMMARY OF THE INVENTION

A supersonic flow device is obtained by using a working fluid which is driven by any adequate means at a predetermined flow rate along a predetermined path. In this flow path, a nozzle spray is placed which is designed to converge the flow upon itself, causing supersonic flow. The flow path then follows on its own accord a converging diverging configuration, which is effectively the shape that the flow would have if it was contained by a second nozzle or a diffuser. This type of converging diverging flow can be obtained by using a plurality of properly contoured nozzle blades comprising a subsonic throat with a supersonic portion. These back to back subsonic and supersonic sections provide the necessary increase in fluid velocity as the fluid passes through the nozzle, and the proper exit velocity magnitude and direction.

In a gas laser, the lasing medium will undergo a lasing region at supersonic speeds shortly after exit from the nozzle. Downstream from the lasing region the oblique and normal shock wave boundaries provide uninterrupted continuous existence of a lasing region. By an appropriate laser mirror system, the coherent radiation that is emitted can be extracted from the shock-free region.

Because of the unique geometrically imposed converging diverging flow pattern, there is a second throat area downstream of the lasing region which ideally can be adjusted to approximately mach one. Thus, the supersonic flow can be recaptured at a relatively low mach number down stream with minimum loss of pressure.

Various nozzle configurations can be used. These include an array of curved sections of a ring, a plurality of axi-symmetric nozzles, or a modification of the ring sections which are themselves mounted along a circle or warped circle so as to form a partial spherical nozzle array. In another embodiment, the nozzle array can be completely circular in nature and fed along a gas inlet axis of symmetry such that the emitted flow has axial symmetry. This provides a nearly cylindrical region of lasing.

An improved supersonic flow configuration can be obtained by using fluidic or material wall attachment. One such method is to produce a Coanda effect around the supersonic flow pattern by means of a subsonic flow. A high speed jet flow through high speed air jets mounted on the edges of the nozzle configuration is another method which will encourage the tendency to converge when the fluid exits from the supersonic nozzle.

The converging diverging effect, which produces a mach number gradient along the supersonic flow, permits construction of a supersonic wind tunnel which can subject model designs to different mach numbers merely by changing their location within the supersonic flow rather than requiring different flow speeds at different times.

DESCRIPTION OF THE PREFERRED EMBODIMENT

Figure 1:
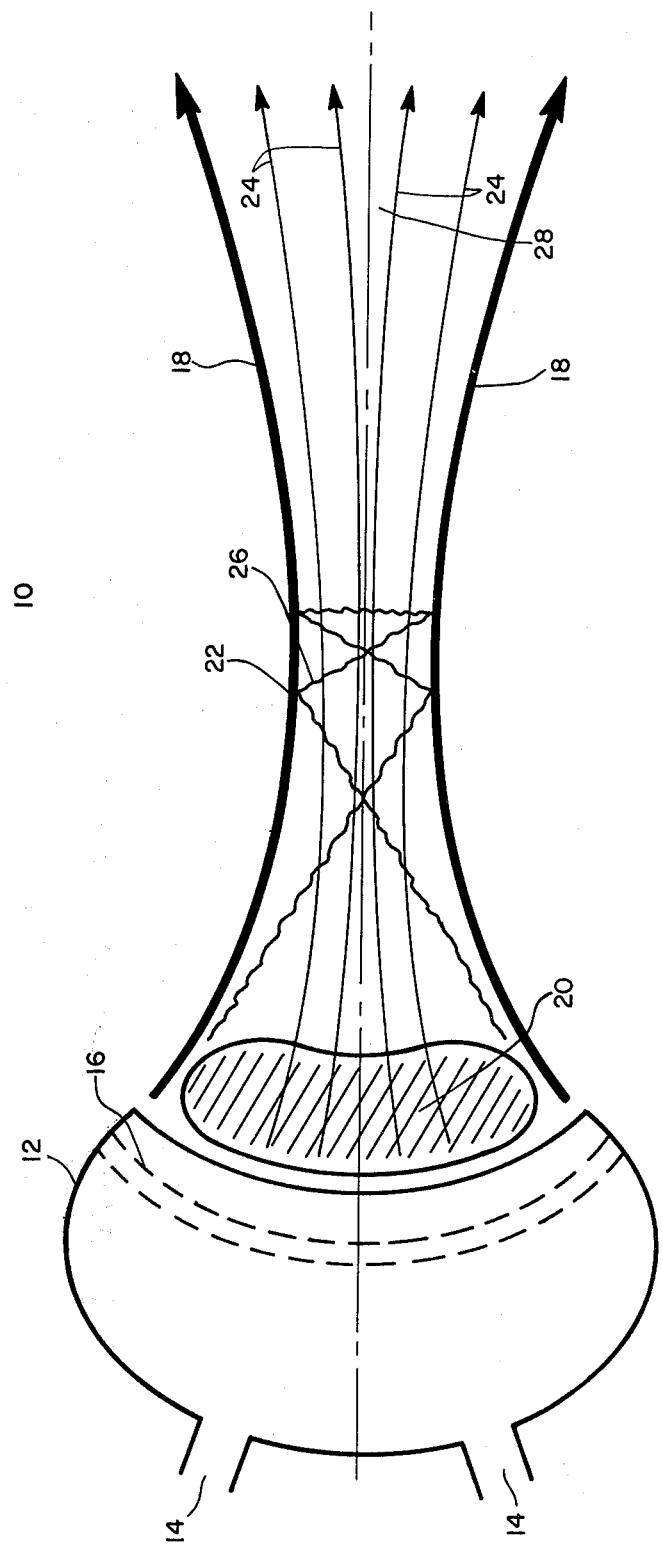
FIG. 1 is a cross sectional view of a self-compressing gas laser, supersonic flow device such as a wind tunnel, or MHD machine.

In FIG. 1 a cross sectional view of a self-compressing supersonic flow as provided by the present invention, is shown in a cross sectional view 10. In cross sectional view 10, a high pressure chamber 12 is fed by a plurality of high pressure lines 14 to produce a region with a high temperature, high static pressure and low mach number. The fluid fed into high pressure chamber 12 passes through a curved supersonic nozzle array 16 represented by dashed lines. Supersonic nozzle array 16 provides a high expansion ratio for a minimum length nozzle to produce an inviscid supersonic flow within a boundary layer 18. Fluid flow into region 20 will be characterized as a low temperature, low static pressure and high mach number region. If the supersonic flow is used in conjunction with a gas laser, region 20 corresponds to the lasing region where population inversion is present and radiation emission can occur. Because of the nature of the region, flow will continue within boundary layers 18 through a second throat area 22 which is unique in that it is not required to have any external walls to maintain its fluid shape. The fluid travels at supersonic speeds along streamlines 24 and is ideally an inviscid core flow, since it can support no shearing stress. Within the core flow, oblique and normal shock structure 26, represented by lines shown, will occur. Shock structure 26 will result in a decreasing mach number as one progresses from region 20 to second throat 22. With proper design, the mach number in second throat 22 can be approximately mach one. After passing through second throat 22, the fluid flow will expand as shown until it reaches a region 28, where the fluid is characterized as having high temperature, moderate static pressure and low mach number.

FIGS. 2A, 2B and 2C show an expanded view of nozzle blade configuration for the present invention. FIG. 2A shows a side view of high pressure chamber 12. Supersonic nozzle 16 consist of nozzle entrances 30 and nozzle throats 32 on opposite sides of the curved blade shown. The nozzles are arranged along a portion of a circular arc. This arrangement is a partial spherical array of nozzles. In FIG. 2B, which looks upstream into individual nozzle blades 34, blades 34 are shown as they are mounted in the opening to high pressure chamber 12. Along the cross section shown as CC, which is shown in FIG. 2C, a cross section of nozzle blades 34 is shown. As the fluid flows along arrow 36, it passes through a subsonic section 38, through throat 32 and into supersonic section 40.

Figure 3:
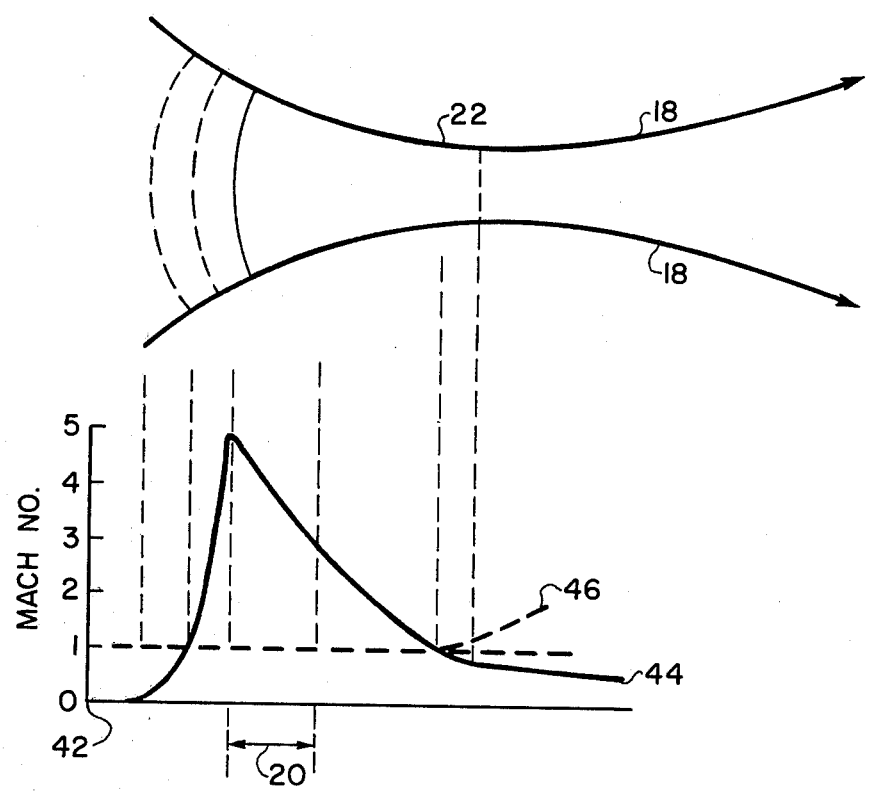
FIG. 3 shows a graphical representation of the change in mach number along the converging diverging supersonic flow pattern of the present invention.

FIG. 3 shows the change in mach number within the supersonic flow within boundary 18. The mach number will change along the center line of the self compressing inviscid flow as shown in graph 42. For a gas dynamic laser, lasing will occur in region 20 which will start right after the peak mach number is reached. Graph 42 contains 2 different tails, 44 and 46. Tail 44 represents an ideal diffuser with a shockless transition from supersonic to subsonic flow. Tail 46, represented by a dashed line, represents the design goal of a weak normal shock just downstream of the second throat represented by position 22.

Figure 2:
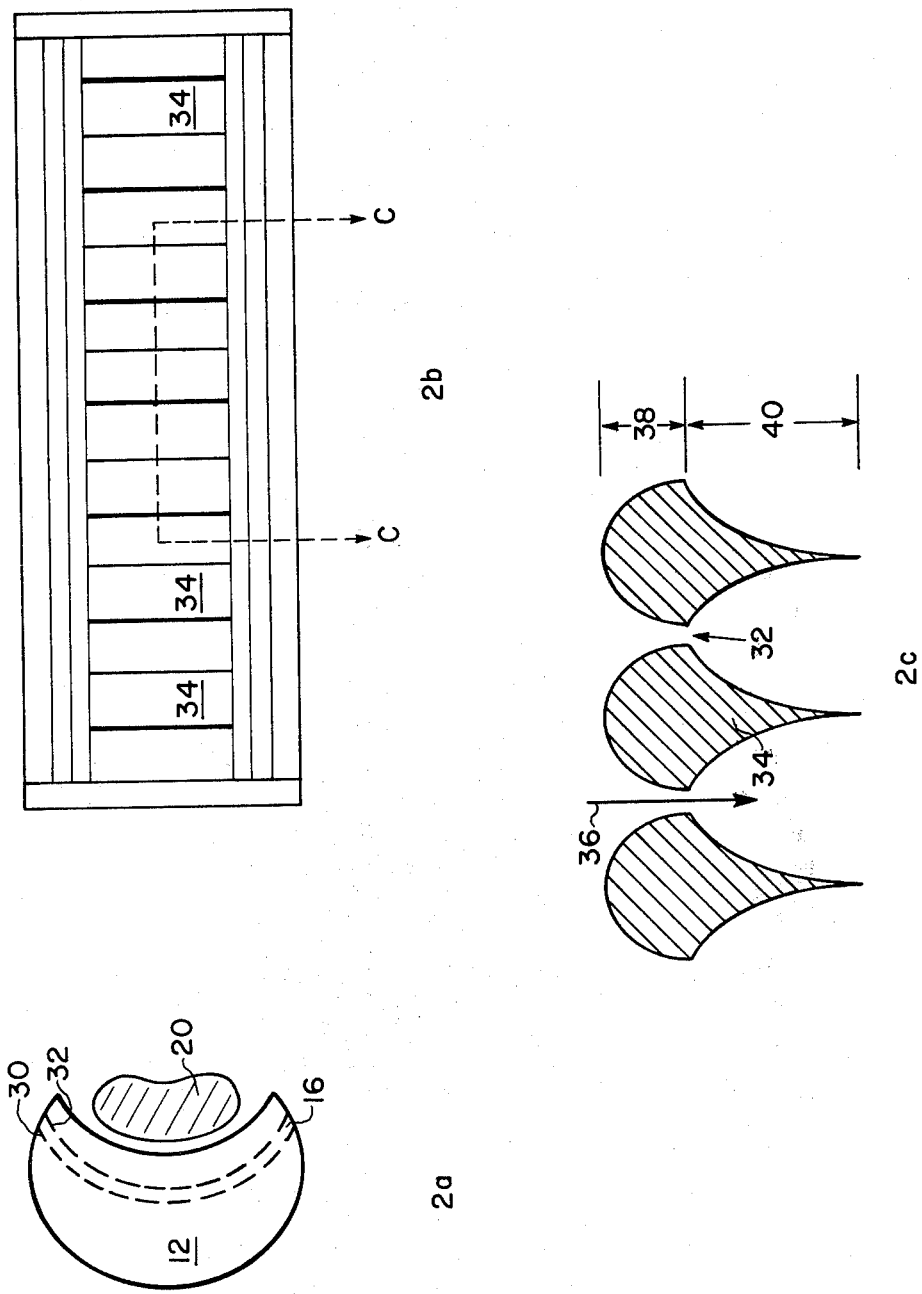
FIGS. 2A, 2B and 2C show a general structural relationship of a high pressure chamber and supersonic nozzle design.
Figure 4:
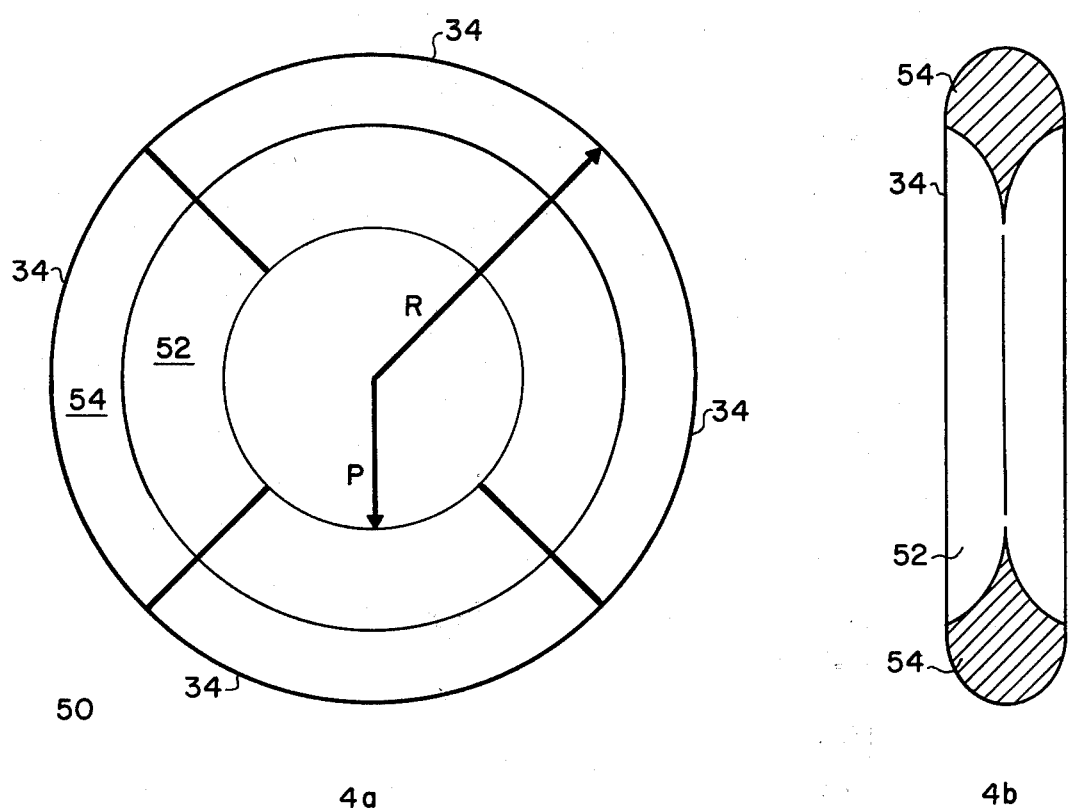
FIGS. 4A and 4B show one method of producing supersonic nozzle blades suitable for the present invention.

FIG. 2 represents a possible construction technique for manufacturing a self compressing nozzle blade from ring segments. One possible method shows a ring 50 of radius R which is quartered into four segments 34, each of which will serve as an individual nozzle blade as shown in FIG. 2. Some sort of molding or shaping process can be used to create a basically donut shaped ring with a very thin center section area 52 and a very thick outer tear drop shape segment 54. A smaller circle of radius P is actually void of material. Ring 50 shown in FIG. 4A is a donut. FIG. 4B shows a cross section of circle 50 which produces the desired subsonic and supersonic sections for each individual blade as shown.

Figure 5:
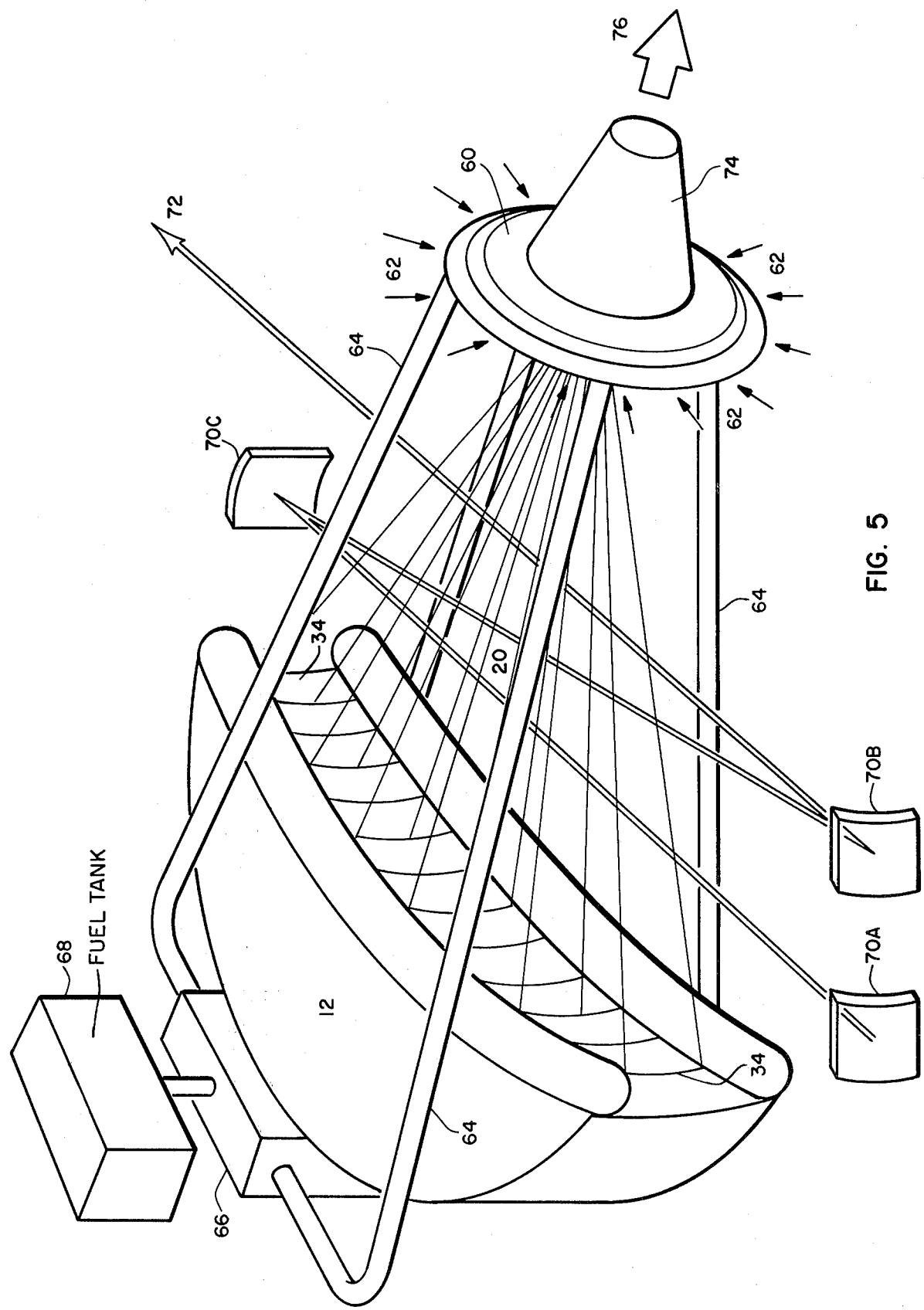
FIG. 5 shows a functional model of a gas dynamic laser using the present invention.

In FIG. 5, a working concept for a self compressing combustion driven air breathing gas dynamic laser is shown. Once again previous identified components are labeled the same where their function remains unchanged. In the gas dynamic laser, an air compressor 60 is shown with ambient air inlets 62 for generating a high pressure gas flow along high pressure air lines 64. High pressure lines 64 carry the compressed air back to a high pressure combustor manifold 66 which receives an appropriate fuel from a fuel tank 68. For a gas dynamic laser, a fuel such as benzene would be appropriate. Combustor manifold 66 burns the mixture of fuel and air producing a gas capable of emitting coherent light which is then dumped into a high pressure chamber 12 as previously described. Combustor manifold 66 could be placed after air compressor 60 just as effectively, with air lines 64 containing the lasing gas. The gas from high pressure chamber 12 is then passed through an array of supersonic nozzle blades 34 which emits a self-compressing fluid flow as described previously. To extract radiation from laser region 20, a laser mirror system 70 comprised of mirrors 70A, 70B, and 70C extract the emitted radiation along an output path 72. Second throat area 22, not shown, is in a relative position with respect to a gas turbine 74 which recovers as much pressure as possible and in turn is used to drive air compressor 60. The exhaust gases of turbine 74 are exhausted into the ambient air as shown by arrow 76. As can be seen from the general breakdown of components in FIG. 5, this concept is somewhat similar in functional nature to a jet engine.

Figure 6:
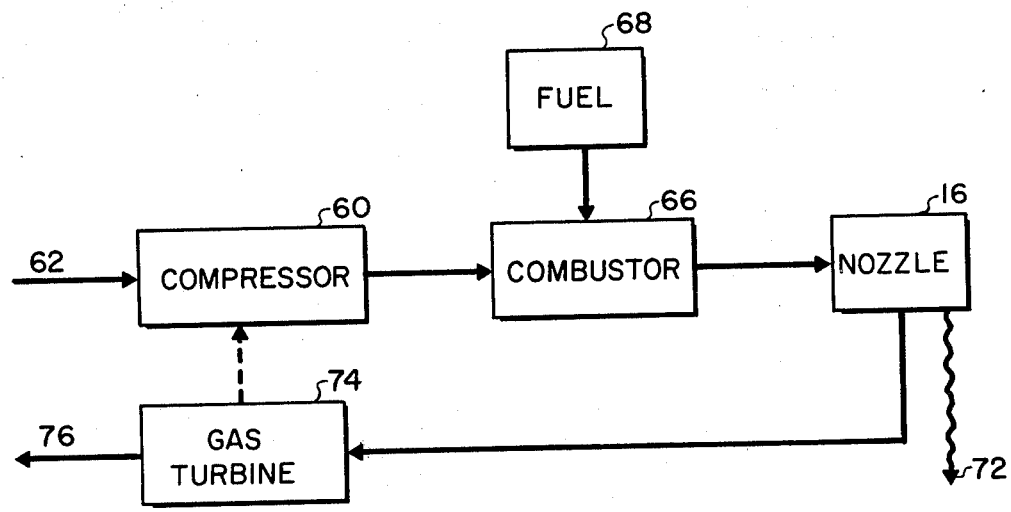
FIG. 6 shows a block diagram of the device shown in FIG. 5.

FIG. 6 provides a generalized block diagram for the gas dynamic laser shown in FIG. 5. For purposes of example, FIG. 6 will assume a $CO_2$ gas dynamic laser at sea level. However, it will be clear to those skilled in the art that appropriate modifications can be made for other gas dynamic or chemical lasers. Ambient intake air at one atmosphere is taken in along the path represented by arrow 62. This air is passed through an air compressor 60 which will typically increase the relative pressure ratio to a pressure greater than 15 atmospheres. Compressor 60 can be typified by several domestic or foreign high pressure ratio turbo compressor machines now commercially available. Compressed air is fed into a combustor 66, which can again be appropriate commercial jet aircraft components, where it is mixed with fuel from fuel tank 68. The combustion gases have a temperature of approximately 1600° K. This gas is then self-compressed through supersonic nozzle 16 which completes the population inversion necessary for laser emission. Upon emergence from nozzle 16 laser output 72 is generated and the supersonic flow is passed through a gas turbine 74 which once again can be any of several typical gas turbines built commercially by several manufacturers. As described previously, gas turbine 74 is in turn used to drive compressor 60 and exhaust combustion gases to the ambient atmosphere as shown by arrow 76. For the type of fuels and conditions described previously, the typical laser radiation received along output 72 is approximately 10.6 microns for a $CO_2$ gas laser. However, other types of infrared or visible laser devices can easily be made through minor modifications well known in the art.

Figure 7:
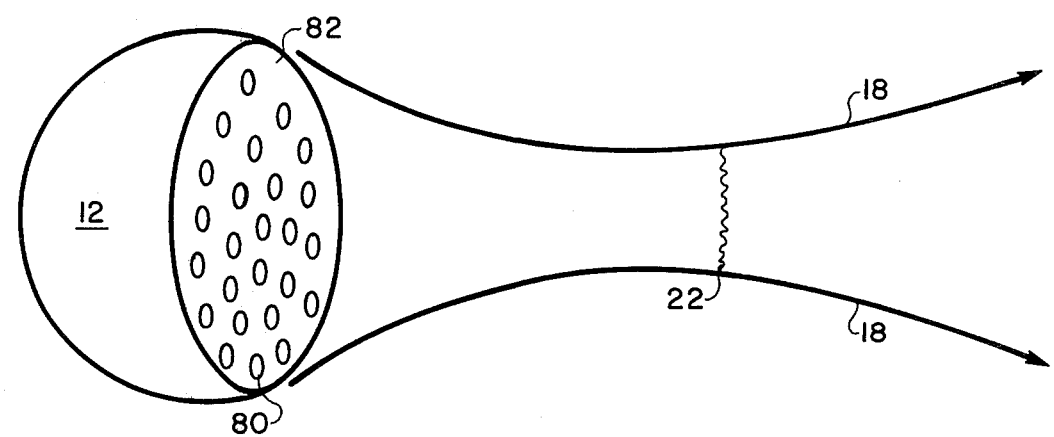
FIG. 7 shows an alternate arrangement of nozzle design to produce a supersonic flow for the present invention.

FIG. 7 shows an axi-symmetric self compressing supersonic flow device which is created by the use of a plurality of axi-symmetric supersonic nozzles 80 which produce a nonuniform flow pattern from a high pressure chamber 12. This flow pattern is further improved by use of a concave axi-symmetric dish 82 which provides the mounting surface for axi-symmetric nozzles 80.

Figure 8:
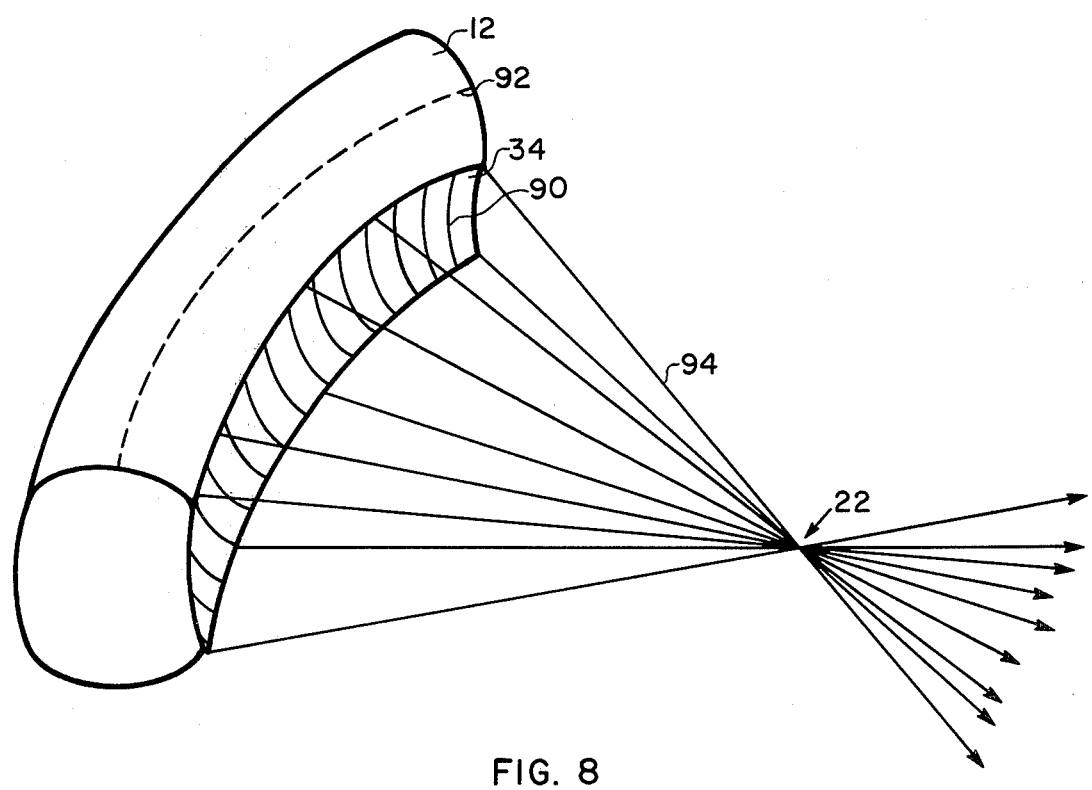
FIG. 8 shows yet another alternative nozzle design for the present invention.

FIG. 8 represents a modified spherical or imploding flow from a spherical rectangular type nozzle array. Once again a high pressure chamber 12 is used to feed a nozzle array 90, which in this case can be composed of the blades shown previously as blades 34. Instead of being arranged in a linear row, blades 34 are mounted along a curved arc 92 which can be the segment of a circle or any other predetermined curve. The result of this curvature will be a flow along stream lines 94 which actually will have the converging flow pattern fold over itself as shown by streamlines 94. Such a flow pattern can be quite useful. Congestion problems can occur in a minimum throat area 22 which cause plugging of the supersonic flow. Such plugging is avoided by slightly warping this configuration.

Figure 9:
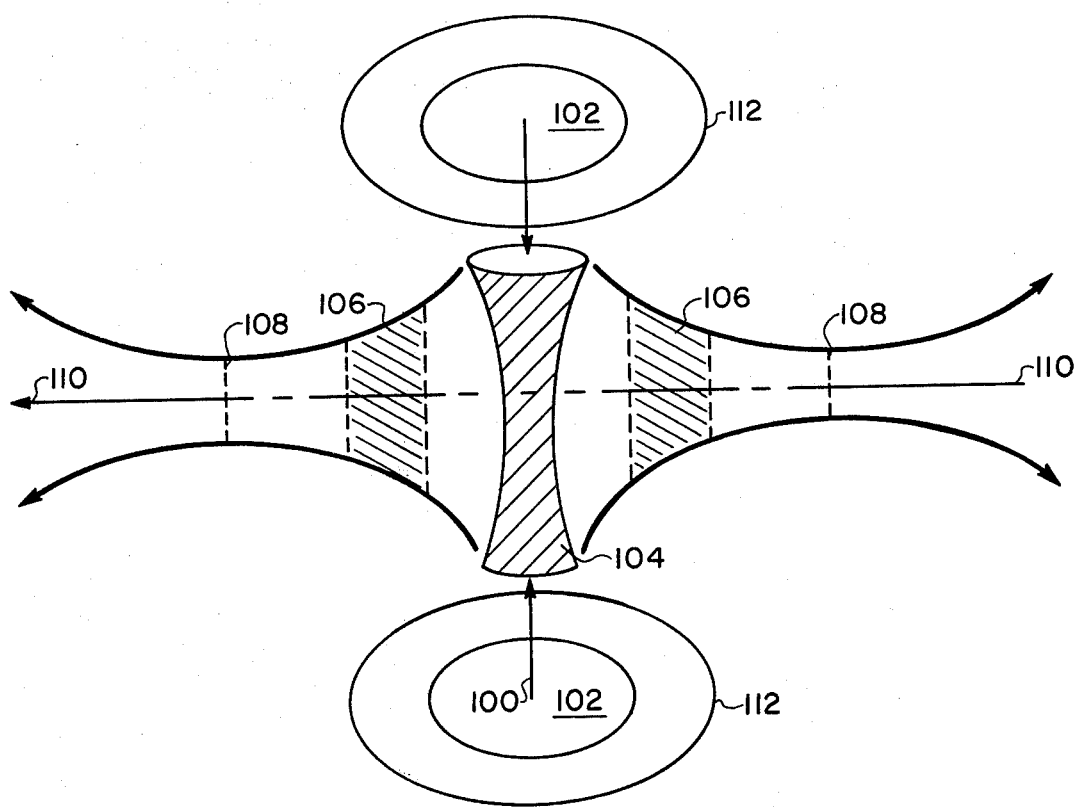
FIG. 9 shows a cylindrical orientation for producing a gas dynamic laser utilizing the present invention.

FIG. 9 shows another embodiment for a toridal self-compressing supersonic flow device which can be used as a gas laser. An axis of symmetry 100 matches a gas inlet flow 102 which comes from a high pressure chamber not shown. A nozzle array 104 is configured to drive self-compressing flow with approximate cylindrical symmetry around axis 100. A cylindrical region of lasing 106 is created with 360° of emission around axis 100. A second throat 108 is created with an outwardly flowing inviscid flow along plane 110 as shown. Once again a converging diverging flow is created. To extract the laser radiation, cylindrical mirrors 112 or a plurality of individual mirrors are required.

Figure 10:
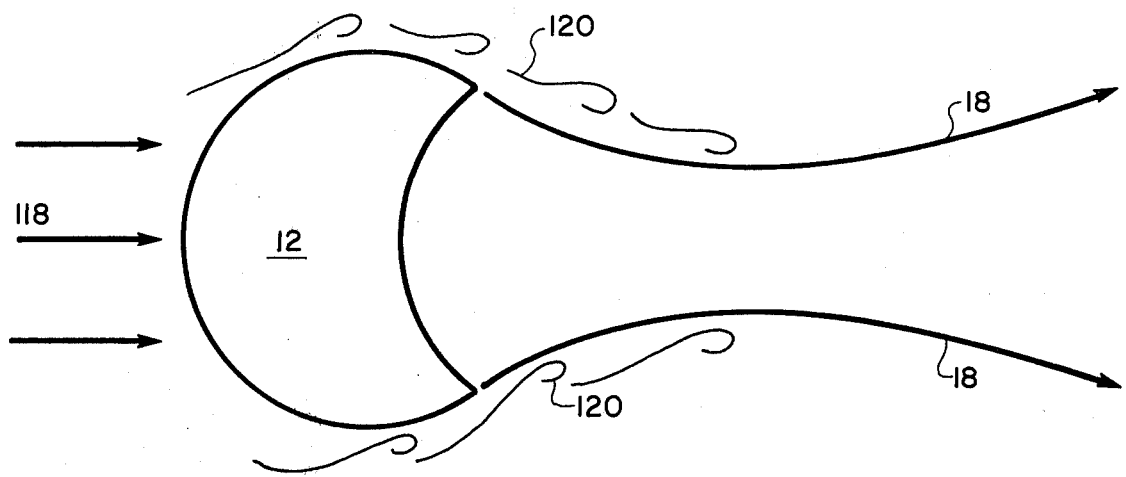
FIG. 10 shows an improvement to flow design of the present invention.

For some applications, some sort of wall effect will improve the supersonic flow's dynamic characteristics. FIG. 10 shows one way in which a wall effect around the supersonic flow contained within boundary area 18 can be provided. The effects shown in FIG. 10 are referred to as the Coanda effect as represented by turbulent flow 120. The Coanda effect can be produced by having a subsonic flow 118 diverged around high pressure chamber 12 such that turbulent flow 120 insues. Turbulent flow 120 on the outside of the smooth stream lines of supersonic flow produces a bounding affect which helps contain the supersonic flow.

Figure 11:
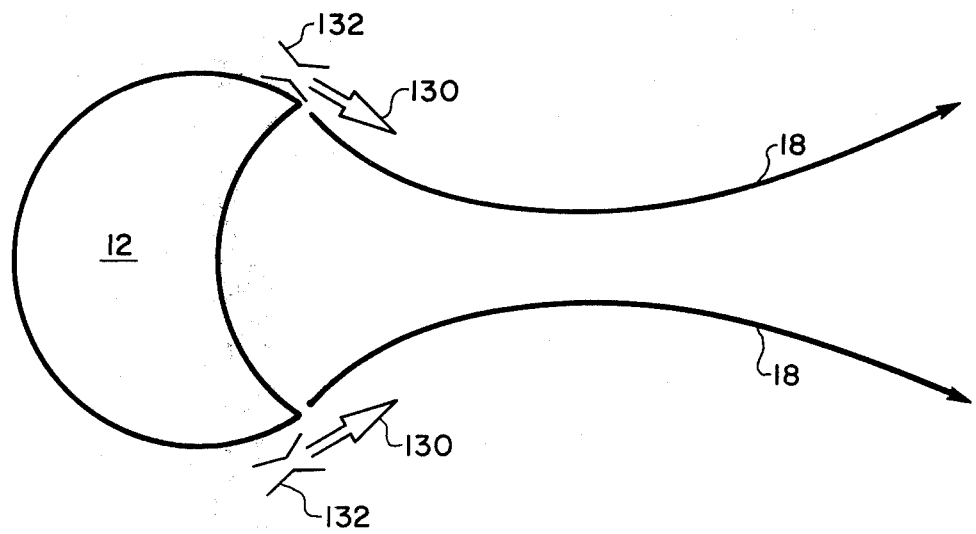
FIG. 11 shows another alternative for improving fluid flow in the present invention.

A similar type of boundary effect can be induced about boundary 18 by use of high speed jet flow as shown in FIG. 11. A high speed jet flow 130 produced by auxillary nozzles 132 and fed by any compressed gas source, not shown, can be used to provide a high enthalpy auxillary flow to augment the supersonic flow pattern.

As can be seen by one familiar with such devices, there are numerous alternatives and modifications that can be made to produce similar effects in self-compressing supersonic flow devices based on the invention taught here. Thus, it can be seen that the present invention encompasses many broad alternatives obvious in light of the general principles and methods shown here.

What is claimed is:

1. A self-compressing supersonic flow device where self-compression is due to convergence and divergence of flow without the need for external walls to constrain a flow pattern comprising:
   a working fluid;
   a means for driving said fluid at a predetermined rate; and
   a plurality of supersonic nozzles placed in a path of said driven fluid for converging said driven fluid, where said convergence arises due to the nozzles which consist of a plurality of curved blades having a subsonic entrance section and a supersonic exit section placed in said driver fluid thereby altering fluid flow such that no external walls are needed to have a convergent-divergent flow pattern downstream from said plurality of nozzles.

2. A self-compressing supersonic flow device as described in claim 1 further comprising a high pressure chamber in said fluid path and behind said supersonic nozzles for maintaining a uniform flow.

3. A self-compressing supersonic flow device as described in claim 1 wherein said curved nozzle blades comprise an arc of a circle of predetermined radius.

4. A self-compressing supersonic flow device as described in either claim 3 further comprising a high pressure chamber in said fluid path and behind said subsonic sections of said supersonic nozzles for maintaining a uniform flow.

5. A self-compressing supersonic flow device as described in claim 1 wherein said supersonic nozzles comprise a plurality of axi-symmetric supersonic nozzles, said plurality having a combined effect of one single self-compressing nozzle.

6. A self-compressing supersonic flow device as described in any of claims 1, 2, 3, or 5 further comprising Coanda effect means for creating a wall of turbulent subsonic flow surrounding said converging fluid upon said fluids emission from said supersonic nozzles.

7. A self-compressing supersonic flow device as described in any of claims 1, 2, 3, or 5 further comprising means for creating a high speed jet flow wall about said predetermined converging fluid upon said fluids emission from said supersonic nozzles.

8. A self-compressing supersonic gas flow laser where self-compression is due to convergence and divergence of flow without need for external walls to constrain a flow pattern comprising:
   an air compressor for inputting a specific volume of air into predetermined motion;
   a manifold connected to said air compressor for inputting said air into a combustion chamber;
   a fuel tank with combustible fuel connected to said manifold for burning with said compressed air when it is in said combustion chamber so as to form a gas capable of lasing;
   a high pressure chamber connected to said manifold for maintaining a uniform high pressure gas flow;

a plurality of supersonic nozzles mounted to said high pressure chamber for focusing said gas from said high pressure chamber into a self-compressing supersonic flow such that said gas emits radiation in a predetermined portion of said supersonic flow, said self-compressing effect achieved by having said plurality of supersonic nozzles arranged to form a convergent-divergent flow without the need for walls surrounding said flow to force such a pattern;

a mirror system placed across said predetermined radiation emitting portion of said supersonic flow for extracting said emitted radiation along a preset path; and a gas turbine placed in said supersonic flow after said predetermined emitting radiation portion and after said self-compressing flow starts to diverge for being driven by said supersonic flow, said turbine connected to said air compressor so as to drive said air compressor.

9. A self-compressing supersonic flow gas laser as described in claim 8 wherein said supersonic nozzles comprise a plurality of curved blades each having a subsonic entrance section and a supersonic exit section.

10. A self-compressing supersonic flow gas laser as described in claim 8 wherein said supersonic nozzles comprise a plurality of axi-symmetric supersonic nozzles, said plurality having a combined effect of one single self-compressing nozzle.

11. A self-compressing supersonic flow gas laser as described in claim 8 wherein said supersonic nozzle comprises approximate cylindrical symmetry about an axis such that the supersonic self-compression pattern emitted from said supersonic nozzles has a cylindrical region of lasing.

12. A self-compressing supersonic flow gas laser as described in any of claims 8, 9, 10, or 11 further comprising Coanda effect means for creating a wall of turbulent subsonic flow surrounding said supersonic flow from said supersonic nozzles.

13. A self-compressing supersonic flow gas laser as described in any of claims 8, 9, 10, or 11 further comprising means for creating a high speed jet flow wall about said supersonic flow from said supersonic nozzles.

14. A self-compressing supersonic flow gas laser as described in any of claims 8, 9, 10, or 11 wherein said combustable fuel comprises benzene.

15. A self-compressing supersonic flow device where self-compression is due to convergence and divergence of the flow without the need for external walls to constrain flow pattern comprising:
   a working fluid;
   a means for driving said fluid at a predetermined flow rate; and
   a plurality of curved blades having a subsonic entrance section and a supersonic exit section placed in said driven fluid in a pattern which causes said driven fluid to follow a convergent-divergent path without the need for walls surrounding said flow to force such a convergent-divergent path, said plurality of curved blades pattern being a partial spherical array of supersonic nozzles.

16. A self-compressing supersonic flow device as described in claim 15 further comprising means for creating a high speed jet flow wall about said predetermined focused fluid upon said fluids emission from said plurality of curved blades.

17. A self-compressing supersonic flow gas laser where self-compression is due to convergence and divergence of the flow without the need for external walls to constrain a flow pattern comprising:
   an air compressor for inputting a specific volume of air into predetermined motion;
   a manifold connected to said air compressor for inputting said air into a combustion chamber;
   a fuel tank with combustible fuel connected to said manifold for burning with said compressed air when it is in said combustion chamber so as to form a gas capable of lasing;
   a high pressure chamber connected to said manifold for maintaining a uniform high pressure gas flow;
   a plurality of curved blades having a subsonic entrance section and a supersonic exit section, said plurality configured to form a partial spherical array of supersonic nozzles, said partial spherical array mounted to said high pressure chamber for focusing said gas from said high pressure chamber into a self-compressing supersonic flow such that said gas emits radiation in a predetermined portion of said supersonic flow, said self-compressing effect achieved by having said plurality of curved blades arranged to form a converging flow of the gas without the need for surrounding walls to force the flow into a smaller cross-section area downstream in said flow;
   a mirror system placed across said predetermined radiation emitting portion for extracting said emitted radiation along a preset path; and
   a gas turbine placed in said supersonic flow after said predetermined emitting radiation portion and after said self-compressing flow starts to diverge for being driven by said supersonic flow, said turbine connected to said air compressor so as to drive said air compressor.

18. A self-compressing supersonic flow device as described in claim 17 further comprising Coanda effect means for creating a wall of turbulent subsonic flow surrounding said focused supersonic fluid upon said fluids emission from said plurality of curved blades.

19. A self-compressing supersonic flow gas laser as described in claim 17 further comprising Coanda effect means for creating a wall of turbulent subsonic flow surrounding said supersonic flow from said plurality of curved blades.

20. A self-compressing supersonic flow gas laser as described in claim 17 further comprising means for creating a high speed jet flow wall about said supersonic flow from said plurality of curved blades.

21. A self-compressing supersonic flow gas laser as described in claim 17 wherein said combustible fuel comprises benzene.

* * * * *